US012516775B2

(12) United States Patent
Barr

(10) Patent No.: US 12,516,775 B2
(45) Date of Patent: Jan. 6, 2026

(54) SUPPORTIVE HOLDER APPARATUS AND ASSOCIATED SYSTEMS AND METHODS

(71) Applicant: Edwin Todd Barr, Stanley, NC (US)

(72) Inventor: Edwin Todd Barr, Stanley, NC (US)

(*) Notice: Subject to any disclaimer, the term of this patent is extended or adjusted under 35 U.S.C. 154(b) by 50 days.

(21) Appl. No.: 18/583,493

(22) Filed: Feb. 21, 2024

(65) Prior Publication Data

US 2024/0377025 A1    Nov. 14, 2024

Related U.S. Application Data

(60) Provisional application No. 63/501,551, filed on May 11, 2023.

(51) Int. Cl.
*A01K 97/10* (2006.01)
*F16M 13/04* (2006.01)
*F41C 33/00* (2006.01)

(52) U.S. Cl.
CPC .............. *F16M 13/04* (2013.01); *A01K 97/10* (2013.01); *F41C 33/001* (2013.01)

(58) Field of Classification Search
CPC .............. A45F 2005/008; A45F 5/1566; A45F 2003/006; A45F 5/021; A45F 5/02; A45F 2003/003; A01K 97/10; Y10S 224/922
USPC ......................................... 224/922; D22/147
See application file for complete search history.

(56) References Cited

U.S. PATENT DOCUMENTS

| 1,577,612 | A | * | 3/1926 | Dees | A01K 97/10 248/165 |
| 1,761,497 | A | * | 6/1930 | Smith | A01K 97/10 248/539 |
| 2,693,332 | A | * | 11/1954 | Albert | A01K 97/10 248/314 |
| D231,525 | S | * | 4/1974 | Curtis | D22/147 |
| 5,232,137 | A | * | 8/1993 | Devine | A45F 5/02 224/678 |
| 5,440,465 | A | * | 8/1995 | Hasness | F21V 17/002 362/396 |
| 6,269,990 | B1 | * | 8/2001 | Gray | A01K 97/10 224/267 |
| 6,357,639 | B1 | * | 3/2002 | Williams | A01K 97/10 224/245 |
| 6,626,409 | B1 | * | 9/2003 | Thompson | A01K 97/10 248/539 |
| 8,132,582 | B2 | * | 3/2012 | Goebel | A45B 11/02 224/188 |
| 2007/0099681 | A1 | * | 5/2007 | Kielland | A45F 5/02 455/575.1 |
| 2023/0094262 | A1 | * | 3/2023 | Ellwood | A01K 97/10 43/21.2 |

* cited by examiner

*Primary Examiner* — Adam J Waggenspack
(74) *Attorney, Agent, or Firm* — Shumaker, Loop & Kendrick, LLP; S. Alexander Long, Jr.; Lloyd J. Wilson

(57) ABSTRACT

Apparatuses, systems and methods of a supportive holder include an elongated body comprising a length extending from a first end to a second end, the elongated body further comprising a cylindrical receiving cavity at the first end configured to receive at least a portion of an elongated rod. Further the supportive holder includes support strap(s) each comprising a respective clip, each respective clip being configured to receive at least a portion of the elongated body, and at least one clip being configured to receive the second end of the elongated body. In addition, the support strap(s) are configured to couple to a user's appendage during use.

11 Claims, 5 Drawing Sheets

SUPPORTIVE HOLDER APPARATUS AND ASSOCIATED SYSTEMS AND METHODS

CROSS REFERENCE TO RELATED APPLICATIONS

This application claims priority to and benefit of U.S. Provisional Patent Application No. 63/501,551 filed on May 11, 2023 entitled SUPPORTIVE HOLDER APPARATUS AND ASSOCIATED SYSTEMS AND METHODS, the entire contents of which is hereby expressly incorporated by reference.

FIELD OF THE INVENTION

This invention relates generally to the field supportive holders, and more particularly embodiments of the invention relate to apparatuses, systems and methods of supportive holders.

BACKGROUND OF THE INVENTION

Many pastimes, such as fishing, hunting, or photography can require a person to wait for extended periods of time while holding an object such as a fishing pole, firearm, camera, video camera, etc. in an activated position. For instance, with fishing, once a line has been cast, a person may need to wait many minutes, if not hours, to catch a fish. With hunting, once a hunter identifies a target the hunter may spend several seconds, if not minutes, aiming or tracking the target prior to discharging their firearm. Similarly, photographers or videographers may hold their camera equipment for several seconds, if not minutes, while they aim, focus, and capture images of on an object.

However, existing devices and techniques used to assist a person have various shortcomings that may introduce several complexities for individuals that have certain physical limitations. For instance, in general fishing poles, certain long-barreled firearms, certain camera equipment and various other objects often require a person to use two hands while performing the activity. However, various physical limitations can limit use of a person's hands, which may make it difficult to operate such objects. Various devices or holders exist to help hold, steady, or aim the object to assist the person during such activities, but these can be cumbersome to move around frequently and may not fully allow a person with limited use of their hands to easily maneuver and performs the actions necessary to operate such objects effectively.

Thus, a long-felt need exists in the art for improved apparatuses, systems, and methods for supportive holders that assist persons with such limitations to take part in such activities.

BRIEF SUMMARY

Shortcomings of the prior art are overcome and additional advantages are provided through the provision of supportive holder apparatuses, systems, and methods. Disclosed herein is a supportive holder apparatus including an elongated body including a length extending from a first end to a second end, the elongated body further including a cylindrical receiving cavity at the first end that is configured to receive at least a portion of an elongated rod. Further, one or more support straps each including a respective clip, each respective clip being configured to receive at least a portion of the elongated body, and at least one clip being configured to receive the second end of the elongated body. In addition, the one or more support straps are configured to couple to a user's appendage during use.

According to one embodiment, the elongated rod comprises a fishing pole.

According to one embodiment, the elongated rod comprises a monopod trigger stick.

According to one embodiment, the second end comprises a shaft comprising a diameter that is narrower than the cylindrical receiving cavity.

According to one embodiment, the length of the elongated body further comprises a midsection positioned between the first end and the second end, wherein the cylindrical receiving cavity further comprises a first portion near the first end and a second portion near the midsection, the second portion comprising an intermediate diameter that is narrower than the first portion but wider than the diameter of the shaft.

According to one embodiment, the one or more support straps are configured to be coupled along an appendage length of the user's appendage, wherein a first strap of the one or more support straps is positioned proximate the midsection and a second strap of the one or more support straps is positioned proximate the second end.

According to one embodiment, the appendage comprises a leg of the user, wherein a first strap is configured to be positioned proximate the user's knee and a second strap is configured to be positioned proximate the user's ankle.

Also disclosed is a supportive holder system that includes a supportive holder apparatus that includes a length extending from a first end to a second end, the elongated body further including a cylindrical receiving cavity at the first end configured to receive at least a portion of an elongated rod. Further, the supportive holder apparatus further includes one or more support straps each including a respective clip, each respective clip being configured to receive at least a portion of the elongated body, and at least one clip being configured to receive the second end of the elongated body, where the one or more support straps are configured to couple to a user's appendage during use. The supportive holder system also includes an elongated rod-like device that includes the elongated rod.

According to one embodiment, the elongated rod-like device comprises a fishing pole.

According to one embodiment, the elongated rod-like device comprises a monopod trigger stick.

According to one embodiment, the second end comprises a shaft comprising a diameter that is narrower than the cylindrical receiving cavity.

According to one embodiment, the length of the elongated body further comprises a midsection positioned between the first end and the second end, wherein the cylindrical receiving cavity further comprises a first portion near the first end and a second portion near the midsection, the second portion comprising an intermediate diameter that is narrower than the first portion but wider than the diameter of the shaft.

Further, disclosed herein is a method of use of a fishing pole holder that includes attaching a first support strap to a first section of a user's leg that comprises an anterior side and a posterior side opposite the anterior side, the first section being located proximate a knee of the user's leg, the first support strap comprising a first clip positioned proximate the anterior side. The method also includes attaching a second support strap to a second section of the user's leg, the second section being located proximate an ankle of the user's leg, the second support strap comprising a second clip positioned proximate the anterior side. Further, the method includes coupling an elongated body to the first support strap via the first clip and the second support strap via the second clip, the elongated body comprising a length extending from a first end to a second end, the elongated body further comprising a cylindrical receiving cavity at the first end configured to receive at least a portion of an elongated fishing rod. In addition, the method includes inserting the portion of the elongated fishing rod of the fishing pole into the cylindrical receiving cavity.

According to one embodiment, the method further includes casting the fishing pole prior to the inserting of the portion of the elongated fishing rod.

According to one embodiment, the method further includes reeling in a line of the fishing pole, the reeling including spinning a reel of the fishing pole to reel in the line.

According to one embodiment, the elongated fishing rod extends from a proximal end to a distal end, the portion of the elongated fishing rod inserted into the cylindrical receiving cavity comprising the proximal end, wherein the reeling further includes extending the leg to lift up the distal end and bending the leg to drop the distal end.

According to one embodiment, the extending and bending are repetitively performed during the reeling.

According to one embodiment, the second end comprises a shaft comprising a diameter that is narrower than the cylindrical receiving cavity.

According to one embodiment, the length of the elongated body further comprises a midsection positioned between the first end and the second end, wherein the cylindrical receiving cavity further comprises a first portion near the first end and a second portion near the midsection, the second portion comprising an intermediate diameter that is narrower than the first portion but wider than the diameter of the shaft.

According to one embodiment, at least one strap of the first support strap and the second support strap comprises a ring, a hook material portion, and a loop material portion, wherein the ring is configured to receive either the hook material portion or the loop material portion such that once either the hook material portion or the loop material portion is received through the ring, either the hook material portion or the loop material portion doubles back to interlock hook material of the hook material portion with loop material of the loop material portion.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
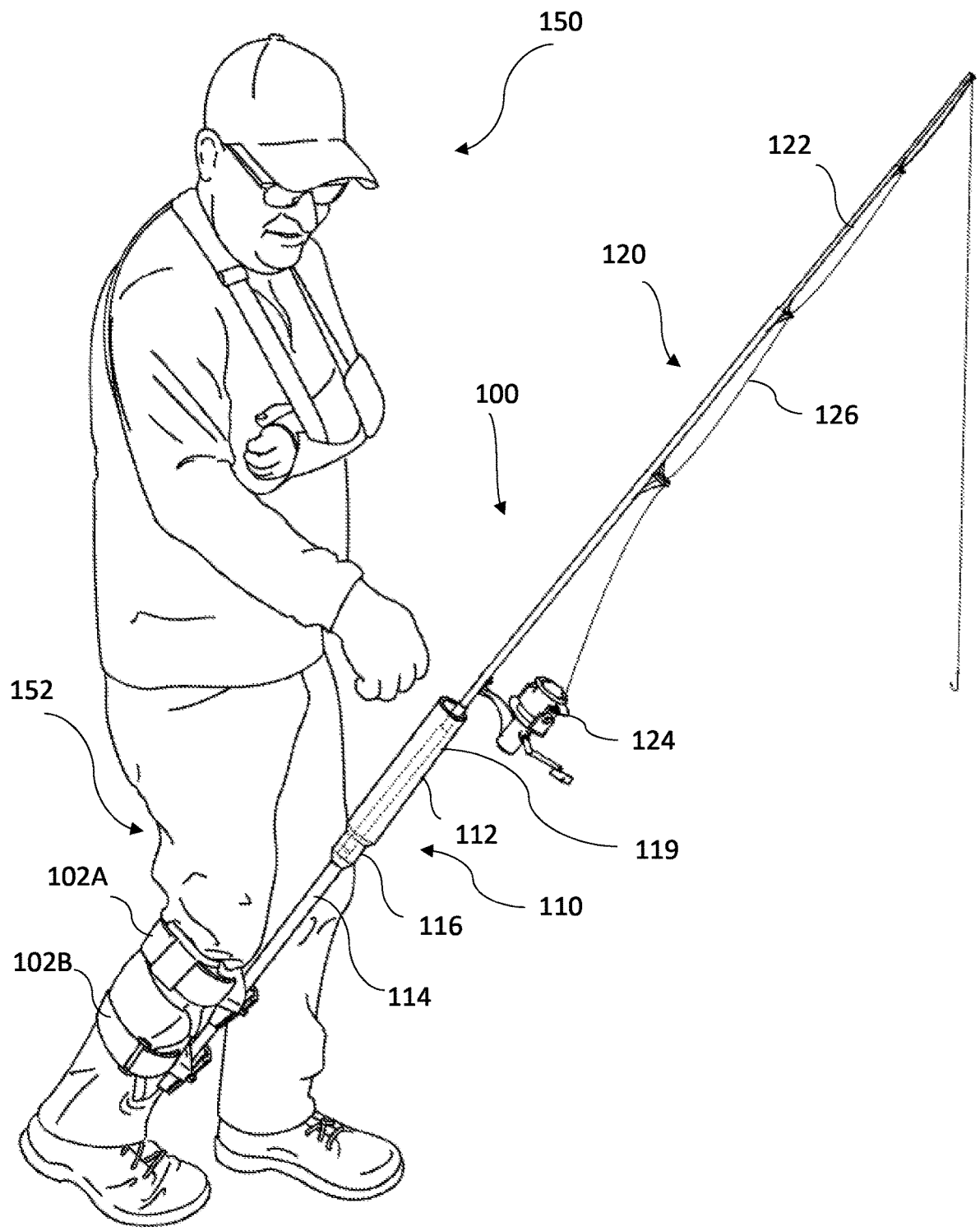
FIG. 1 illustrates a perspective view of an example supportive holder system during use, in accordance with one embodiment of the disclosure.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The terms "couple," "coupled," "couples," "coupling," "fixed," "attached to," "connect," "connected," and the like should be broadly understood to refer to connecting two or more elements, either directly or indirectly through intervening elements. Coupling (e.g., mechanical coupling) may be for any length of time, e.g., permanent or semi-permanent or only for an instant.

"A" and "an" as used herein indicate "at least one" of the item is present; a plurality of such items may be present, when possible. Spatially relative terms, such as "front," "back," "inner," "outer," "bottom," "top," "horizontal," "vertical," "upper," "lower," "side," "above," "below," "beneath," "upwardly," "outwardly," "inwardly," and the like, may be used herein for case of description to describe one element or feature's relationship to another element(s) or feature(s) as illustrated in the figures. Spatially relative terms may be intended to encompass different orientations of the device in use or operation in addition to the orientation depicted in the figures.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context.

As used herein, substantially is defined as "to a considerable degree" or "proximate" or as otherwise understood by one ordinarily skilled in the art or as otherwise noted. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

The present technology relates to apparatuses, systems, and methods for supportive holders. In particular, the disclosed apparatuses, systems, and methods address the long-felt need that exists in the art to assist individuals with limited use or mobility of a hand, an arm, and/or with other physical limitations in order help those individuals to enjoy various pastimes in a manner that is less cumbersome and easier to maneuver than existing assistive devices or technologies. In general, when fishing, a person would need a way to support the fishing rod while reeling in the line using a reel and existing assistive devices and processes are often immovable or have limited mobility, which make it difficult to hook the fish or incorporate various fishing techniques such as "pump" and "wind" into the reeling process. Further, such assistive devices may not necessarily be designed in manner that would provide sufficient support for individuals with limited use or mobility of a hand, arm, or other with other physical limitations that may make it difficult to fully enjoy fishing.

In addition, the disclosed supportive holder apparatus can be utilized with various systems with other devices such as a monopod trigger stick and a firearm in order to provide support for the firearm during use, and a camera monopod to help hold the weight and provide stabilizing support to the camera when capturing an image and/or video.

FIG. 1 illustrates a perspective view of an example supportive holder system 100 during use, in accordance with one embodiment of the disclosure. The supportive holder system 100 a supportive holder apparatus 110 and an elongated rod-like device 120 that includes an elongated rod 122. The elongated rod-like device 120 may include, according to various embodiments, any device that includes an elongated portion that is sized and shaped or otherwise configured to be inserted into a cylindrical receiving cavity 112 of the supportive holder apparatus 110. Example devices can include a monopod trigger stick, a camera monopod, a fishing pole (e.g. such as the rod-like device 120 depicted in FIG. 1), or any other elongated rod-like device. As depicted, the elongated rod-like device 120 is a fishing pole that includes an elongated rod 122, a reel 124, and a line 126.

The supportive holder apparatus 110 includes a cylindrical receiving cavity 112 at a first end of an elongated body 119 of the supportive holder apparatus 110. The cylindrical receiving cavity 112 may include a radius that is sized and shaped or otherwise configured to receive a portion of the elongated rod-like device 120 as depicted, according to a non-limiting example, by a handle portion of the elongated rod 122 being inserted within the cylindrical receiving cavity 112. In addition, the cylindrical receiving cavity may include a first portion near a first end of the elongated body 119 of the supportive holder apparatus 110 and a second portion 116 near a midsection of the elongated body 119 of the supportive holder apparatus 110. The second portion 116 may include an intermediate diameter that is narrower than the first portion of the cylindrical receiving cavity 112 but that is wider than the diameter of the shaft 114 of the elongated body 119 of the supportive holder apparatus 110.

The supportive holder apparatus 110 may also include one or more support straps 102A, 102B that are configured to couple to an appendage 152 of a user 150 during use. Further, the one or more support straps 102A, 102B may be sized and shaped or otherwise configured to receive the elongated body 119 during use, to provide support, via the appendage 152, for the elongated body 119 so that the elongated body can thereby provide support for the elongated rod-like device 120. In some embodiments, of the one or more straps 102A, 102B may include padding or a shield-like portion positioned near the clips 104A, 104B to which the clips 104A, 104B are attached and/or against which the clips 104A, 104B are supported so as to protect the user's leg.

Figure 2:
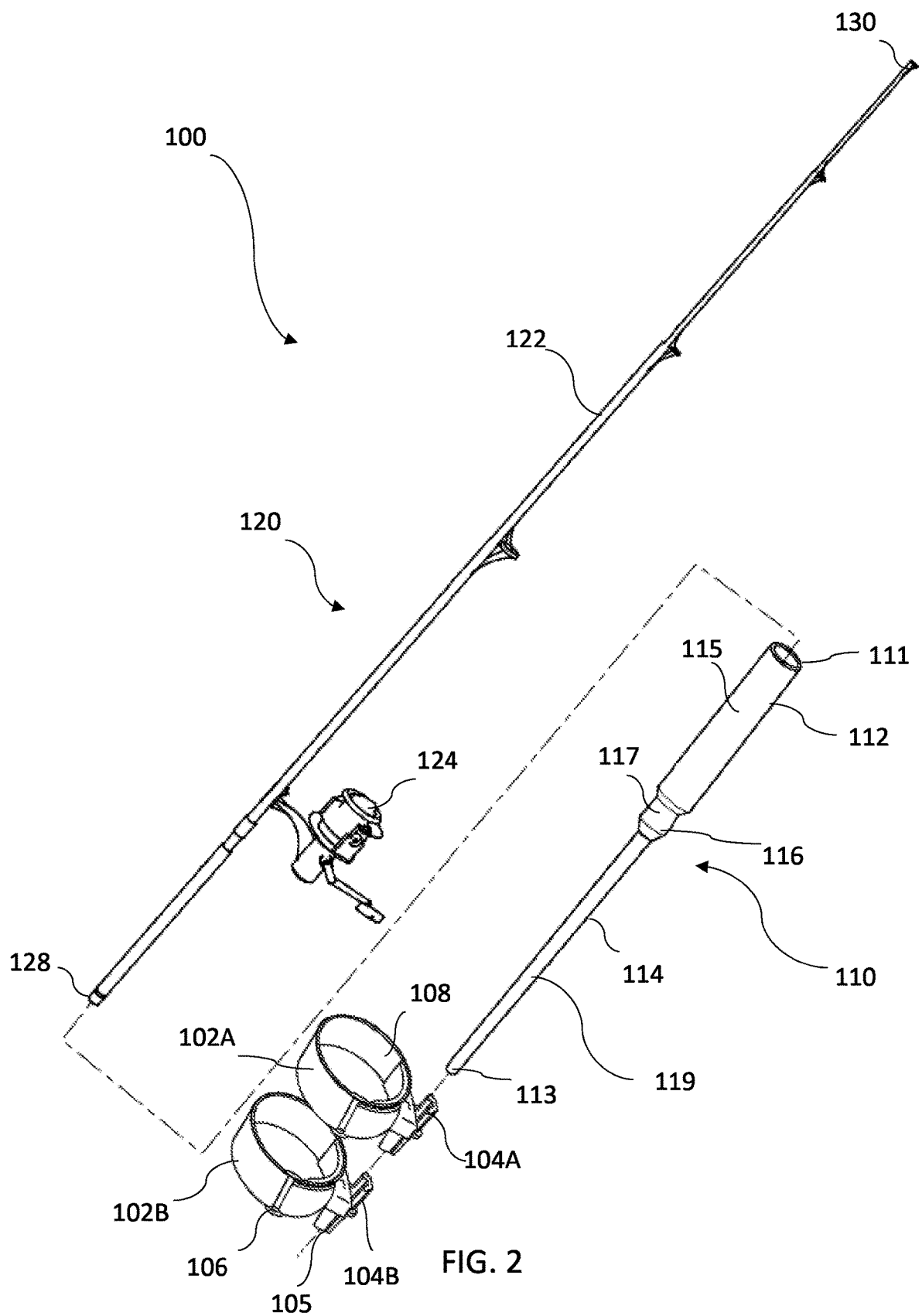
FIG. 2 illustrates a perspective view of the example supportive holder system of FIG. 1, in accordance with one embodiment of the disclosure.

FIG. 2 illustrates a perspective view of the example supportive holder system 100 of FIG. 1, in accordance with one embodiment of the disclosure. The supportive holder system 100 includes a supportive holder apparatus 110 that includes an elongated body 119 and one or more support straps 102A, 102B. The supportive holder system 100 also include an elongated rod-like device 120 that includes an elongated rod 122. The elongated body 119 of the supportive holder apparatus 110 includes a length extending from a first end 111 to a second end 113, where the elongated body 119 includes a cylindrical receiving cavity 112 at the first end 111 that is configured (i.e., sized and shaped or otherwise configured) to receive at least a portion of the elongated rod 122. According to various embodiments, the second end 113 includes a shaft 114 that includes a diameter that is narrower than the cylindrical receiving cavity 112 and is configured (i.e., sized and shaped or otherwise configured) to couple or otherwise removably attach to the one or more support straps 102A, 102B. In some embodiments, the length of the elongated body 119 further includes a midsection 116 positioned between the first end 111 and the second end 113, where the cylindrical receiving cavity 112 further includes a first portion 115 near the first end 111 and a second portion 117 near the midsection 116, the second portion 117 including an intermediate diameter that is narrower than the first portion 115 but wider than the diameter of the shaft 114. In some examples, the second portion 117 is tapered along at least a portion of the length of the second portion 117 such that the second portion 117 forms a funnel-shaped diameter until the second portion 117 meets the shaft 114.

Further, the one or more support straps 102A, 102B of the supportive holder apparatus 110 each include a respective clip 104A, 104B, and each respective clip is configured (i.e., sized and shaped or otherwise configured) to receive at least a portion of the elongated body 119 of the supportive holder apparatus 110. In particular, at least one clip 104B, is configured to receive the second end 113 of the elongated body 119. For instance, according to one example, the second clip 104B may be narrowed and/or include a termination 105 that does not allow the second end 113 to extend beyond the second clip 104B, thereby providing a secure base for the second end 113 of the elongated body 119. Conversely, in some examples, the first clip 104A may include an aperture that is configured (i.e., sized and shaped or otherwise configured) to permit passage of the second end 113 and at least a portion of a shaft 114 of the elongated body 119 through the first clip 104A and extend to the second clip 104B. The one or more support straps 102A, 102B may also include a ring 106 and a band of material 108, where the band of material 108 includes a hook material portion that includes a hook material and a loop material portion that includes loop material, thereby forming hook and loop fasteners (e.g., Velcro®) that may be used to couple or otherwise removably attach the one or more support straps 102A, 102B to an appendage (e.g., a leg) of a user. In some embodiments, the ring 106 is configured to receive either the hook material portion or the loop material portion of the band of material 108 such that once either the hook material portion or the loop material portion is received through the ring 106, either the hook material portion or the loop material portion that was received through the ring 106 doubles back to interlock the hook material of the hook material portion with the loop material of the loop material portion. Advantageously, the one or more support straps 102A, 102B can be configured (i.e. sized and shaped or otherwise configured) to be coupled or otherwise removably attached to a person's appendage (e.g., leg, arm, etc.) during use regardless of whether the person has narrower or wider legs, arms, etc. In some embodiments, the one or more support straps 102A, 102B are configured to be coupled along an appendage length of the user's appendage, where a first strap 102A of the one or more support straps 102A, 102B is positioned more proximate the midsection 116 than a second strap 102B of the one or more support straps 102A, 102B and the second strap 102B is positioned proximate the second end 113. In embodiments in which the appendage includes a leg of the user, the first strap 102A is configured to be positioned proximate the user's knee and the second strap 102B is configured to be positioned proximate the user's ankle.

As depicted, the elongated rod-like device 120 may include, for example, a fishing pole. The fishing pole may include an elongated rod 122 that extends from a portion (i.e., handle portion) of the elongated rod 122 that includes a proximal end 128 to a distal end 130. The fishing pole may also include a reel 124 used to reel in the line (see line 126 of FIG. 1) and is positioned near the handle portion of the elongated rod 122 and would be positioned near the cylindrical receiving cavity 112 during use.

Figures 3A, 3B:
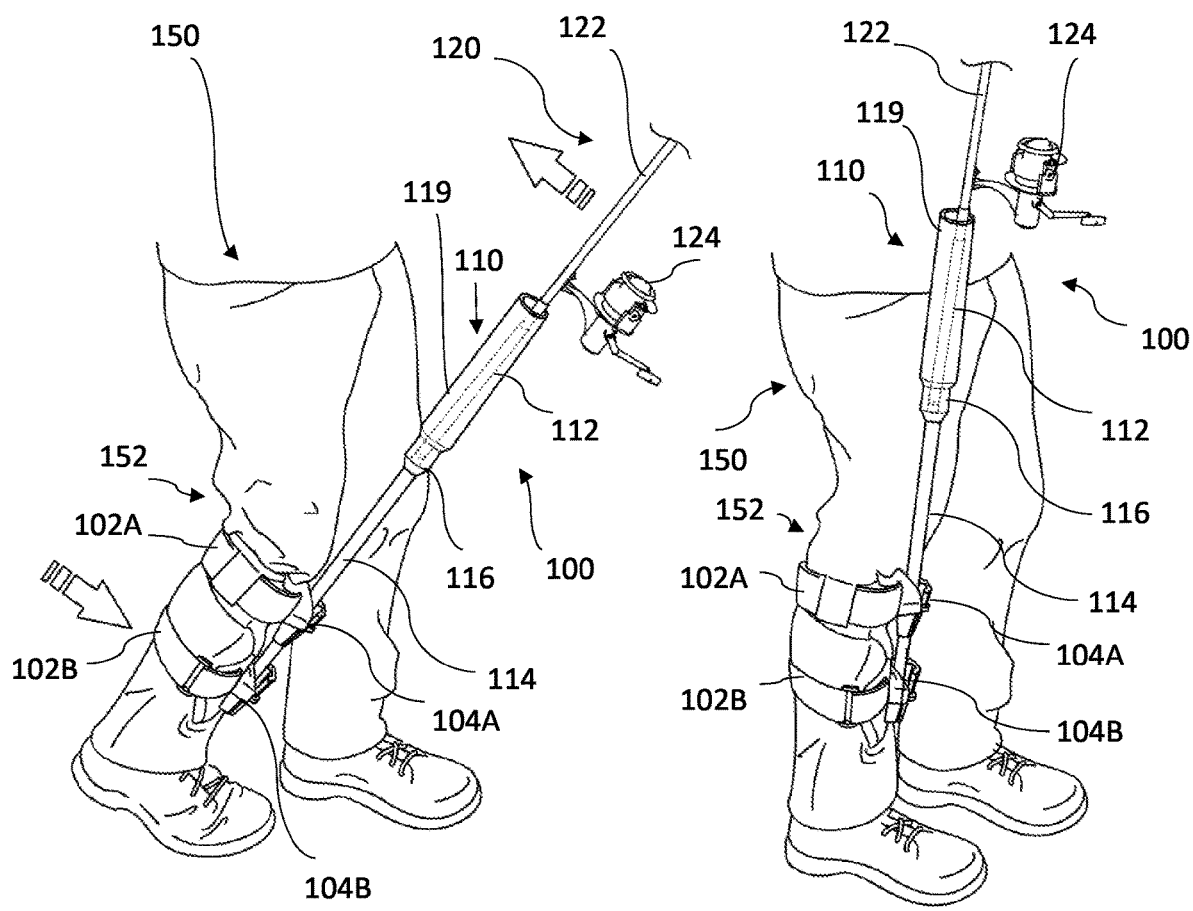
FIG. 3A illustrates a perspective view of the example supportive holder system of FIG. 1 during use that incorporates leg flexion, in accordance with one embodiment of the disclosure.
FIG. 3B depicts a perspective view of the example supportive holder system of FIG. 1 during use that incorporates leg extension, in accordance with one embodiment of the disclosure.

FIG. 3A illustrates a perspective view of the example supportive holder system 100 of FIG. 1 during use that incorporates leg flexion, in accordance with one embodiment of the disclosure, and FIG. 3B depicts the supportive holder system 100 during leg extension. According to one embodiment, in order to reel in the line (see line 126 of FIG. 1), via the reel 124, a user 150 may extend the leg 152, thereby lifting up the distal end (see distal end 130 of FIG. 2) and snapping the elongated rod 122 of the elongated rod-like device 120 back into the position depicted by FIG. 3B to set the hook in the fish's mouth (not shown). Further, the user 150 may repetitively extend and flex their leg 152 while reeling in the line (see line 126 of FIG. 1) in order to raise and lower the distal end (see distal end 130 of FIG. 2). According to one embodiment, during normal use of the elongated rod-like device 120 the leg 152 of the user 150 may be flexed as depicted by FIG. 3A.

In some embodiments, the elongated body 119 may incorporate a telescoping functionality during non-use such that portions of the midsection 116 and/or the shaft 114 collapse into the cylindrical receiving cavity 112 for easy packing and/or storage during non-use. In some embodiments, the telescoping functionality may also be used to modify the length of the elongated body 119 to accommodate different heights and body types of the user 150. In some embodiments, the elongated body 119 may include twist locks or holes and pins that maybe be used to adjust the length of the elongated body 119. The elongated body 119 may include, according to various example implementations, an aluminum or other metallic composition. In some embodiments, the elongated body 119 may include a shoulder strap for easy transport.

Figure 4:
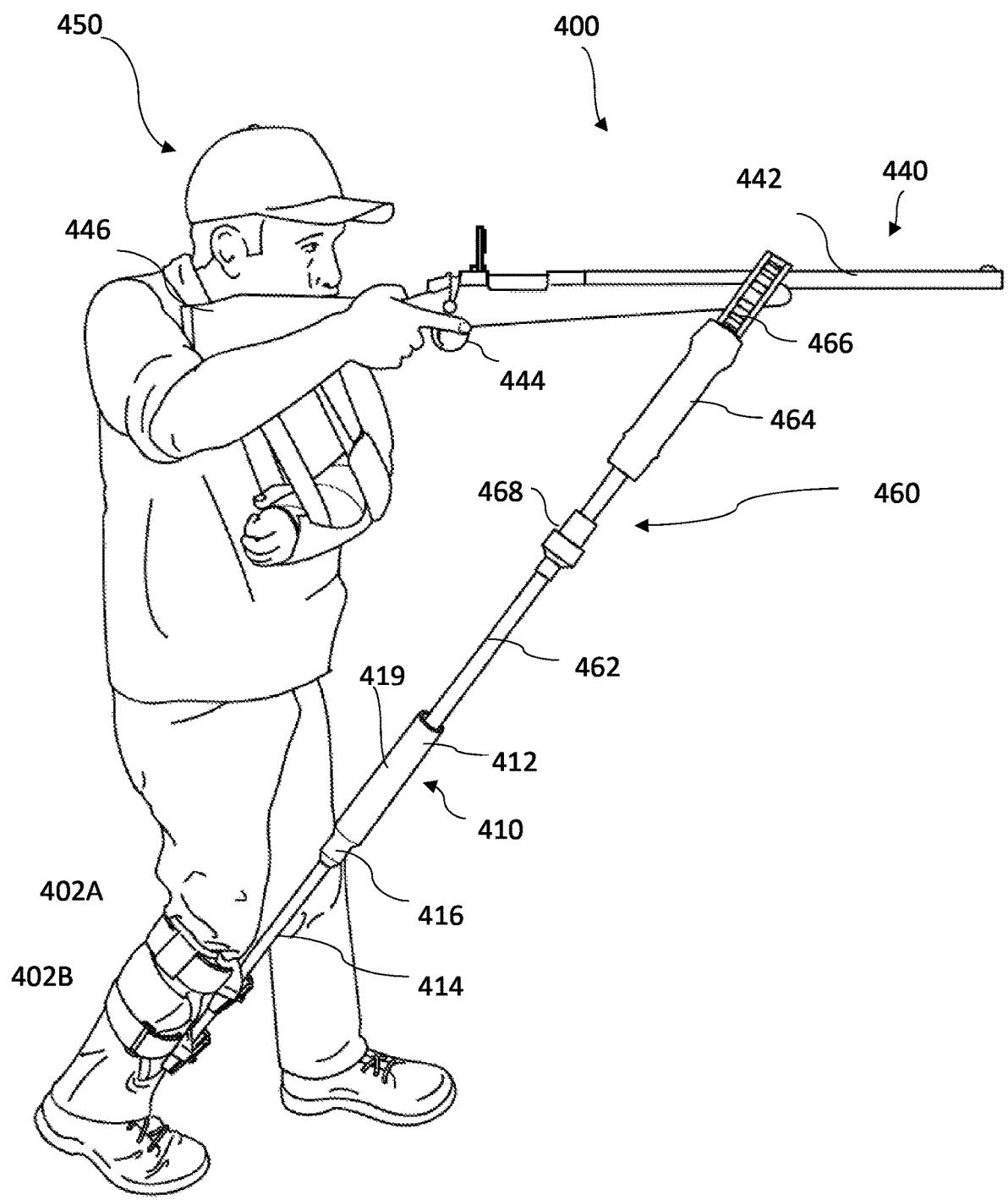
FIG. 4 illustrates a perspective view of an example supportive holder system during use, in accordance with one embodiment of the disclosure.

FIG. 4 illustrates a perspective view of an example supportive holder system 400 during use, in accordance with one embodiment of the disclosure. The supportive holder system 400 includes a supportive holder apparatus 410, an elongated rod-like device 460 (i.e., a monopod trigger stick), and a firearm 440. The supportive holder apparatus 410 may be similar to or otherwise incorporate aspects of supportive holder apparatus 110 described above. The supportive holder apparatus may include one or more straps 402A, 402B coupled or otherwise removably attached to an appendage of the user 450 that are used to couple or otherwise removably attach an elongated body 419 of the supportive holder apparatus 410 during use. The elongated body 419 may include a cylindrical receiving cavity 412, a midsection 416, and a shaft 414. As indicated with reference to aspects of elongated body 119 described above, the cylindrical receiving cavity 412 may include a diameter that is wider than the diameter of the shaft 414. Further, the cylindrical receiving cavity 412 may include a first portion and a second portion, where the second portion is near and/or comprises the midsection 416 and may have an intermediate diameter that is narrower the first portion but wider than the diameter of the shaft.

The monopod trigger stick 460 may also include, according to one embodiment, a yoke 466 that is sized and shaped and otherwise configured to support a barrel 442 of the firearm. In some embodiments, the yoke 466 may include a rubber padding that holds and cushions the firearm 440. The elongated rod-like device 460 (i.e., monopod trigger stick) may also include a handle 464 for gripping the monopod trigger stick. The elongated rod-like device 460 (i.e., monopod trigger stick) may also include a stick leg 462, where the stick leg 462 is sized and shaped or otherwise configured to be inserted into the cylindrical receiving cavity 412 of the elongated body 119. In some embodiments, the monopod trigger stick 460 may also include a twist lock 468 that may be used to adjust the height of the elongated rod-like device 460 (i.e., monopod trigger stick). The firearm 440 may also include a trigger 444 that is used to discharge the firearm 440 and a butt 446 that rests against the shoulder of the user 450.

Although not illustrated, other supportive holder systems may include the supportive holder apparatus (e.g. supportive holder apparatus 110, 410) as well as an elongated rod like device similar to the illustrated elongated rod-like devices 120, 460 as described above, but may include an attachment head for attaching the camera to the elongated rod-like device. The attachment head may include, according to one embodiment, a rivet-reinforcing ball head upon which a camera may include a fastener (e.g., a screw) that can attach to the camera.

Figure 5:
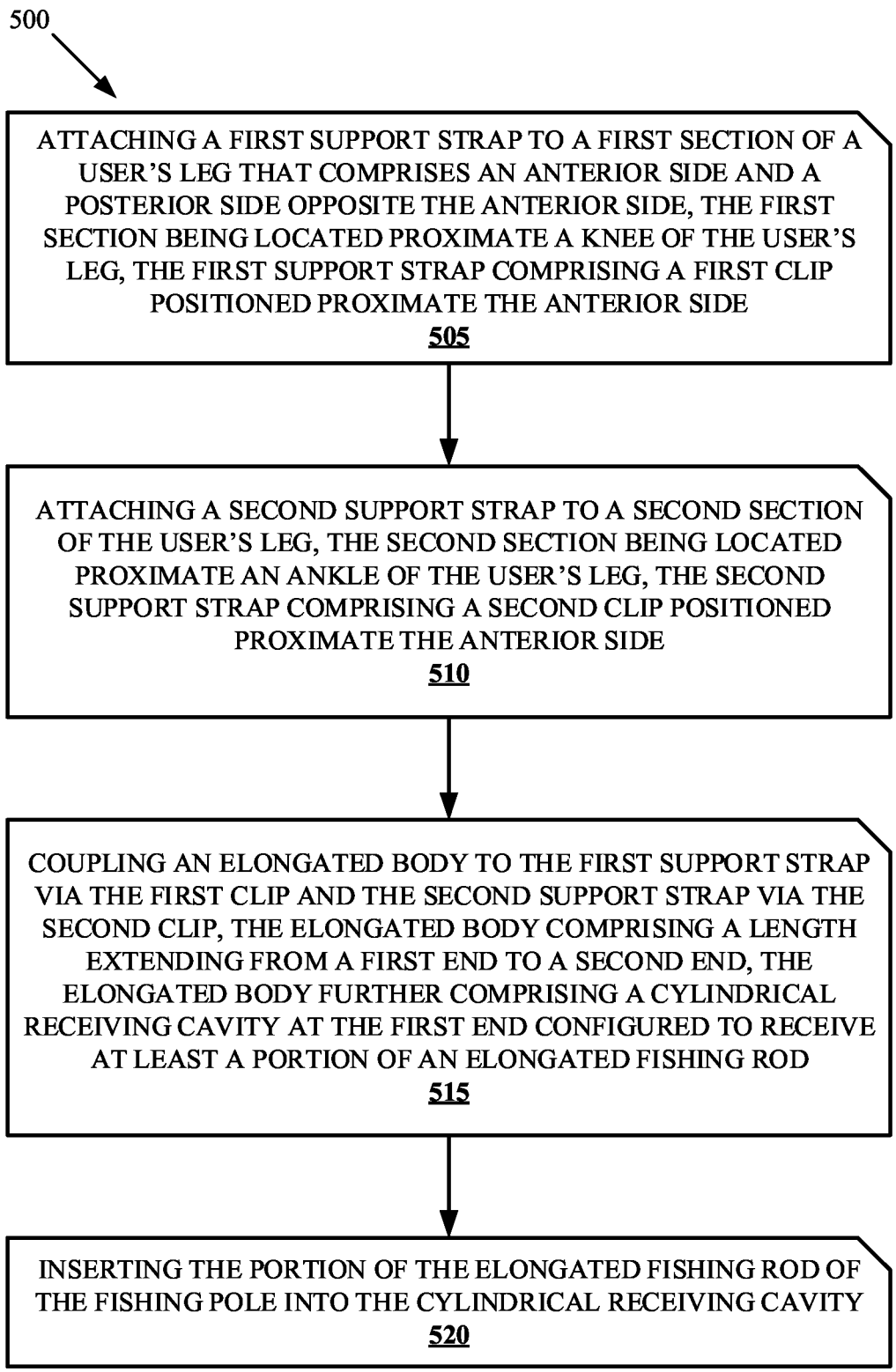
FIG. 5 illustrates a block diagram of an example method of use of a fishing pole holder.

FIG. 5 illustrates a block diagram of an example method 500 of use of a fishing pole holder. At block 505, the method includes attaching a first support strap to a first section of a user's leg, where the leg includes an anterior side and a posterior side opposite the anterior side. The first section of the user's leg is located proximate a knee of the user's leg. Further, the first support strap includes a first clip positioned proximate the anterior side of the user's leg. At block 510, a second support strap is attached to a second section of the user's leg, where the second section is located proximate an ankle of the user's leg. The second support strap includes a second clip positioned proximate the anterior side of the user's leg. At block 515, an elongated body is coupled to the first support strap via the first clip and the second support strap via the second clip, where the elongated body includes a length extending from a first end to a second end, and the elongated body further includes a cylindrical receiving cavity at the first end that is configured to receive at least a portion of an elongated fishing rod. At block 520, the portion of the elongated fishing rod of the fishing pole is inserted into the cylindrical receiving cavity.

In some embodiments, the method 500 further includes casting the fishing pole prior to inserting the portion of the elongated fishing rod, and additionally, or alternatively, may also include reeling in a line of the fishing pole, where the reeling includes spinning a reel of the fishing pole to reel in the line. In some examples, the elongated fishing rod extends from a proximal end to a distal end, and the portion of the elongated fishing rod that is inserted into the cylindrical receiving cavity includes the proximal end. Further, the reeling may further include extending the leg to lift up the distal end of the elongated fishing rod and bending the leg to drop the distal end of the fishing rod. In some examples, the extending and bending of the leg are repetitively performed during the reeling. Advantageously, extending the leg may help in hooking a fish to help secure the fish to the hook at the end of the fishing line and the extending and bending may assist with reeling the fish in.

In some embodiments, the second end of the elongated body may include a shaft that includes a diameter that is narrower than the cylindrical receiving cavity. In some instances, the length of the elongated body also includes a midsection positioned between the first end and the second end, where the cylindrical receiving cavity further includes a first portion near the first end and a second portion near the midsection, where the second portion includes an intermediate diameter that is narrower than the first portion but wider than the diameter of the shaft. Advantageously, the diameter of the midsection may assist with providing a tapering within a bottom of the cylindrical receiving cavity that may assist in reducing the amount of movement of the portion of the elongated rod that is inserted into the cylindrical receiving cavity, thereby providing additional support for the elongated rod.

In some embodiments, at least one strap of the first support strap and the second support strap includes a ring, a hook material portion, and a loop material portion, where the ring is configured to receive either the hook material portion or the loop material portion during the attaching of either the respective first support strap or the respective second support strap such that once either the hook material portion or the loop material portion is received through the ring, either the hook material portion or the loop material portion that was received through the ring is doubled back to facilitate interlocking hook material of the hook material portion with loop material of the loop material portion.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

In the flowchart illustrations and/or block diagrams disclosed herein, each block in the flowchart/diagrams may represent a module, segment, or portion of a method. In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A supportive holder apparatus comprising:
an elongated body comprising a length extending from a first end to a second end, the elongated body further comprising a receiving cavity at the first end configured to receive at least a portion of an elongated rod, wherein the second end comprises a shaft comprising a diameter that is narrower than the receiving cavity; and
one or more support straps each comprising a respective clip, each respective clip being configured to receive at least a portion of the elongated body, and at least one clip being configured to receive the second end of the elongated body wherein the at least one clip is configured to provide a base for securing the second end, having the diameter that is narrower than the receiving cavity, of the elongated body to a respective support strap;
wherein the one or more support straps are configured to couple to a user's leg during use such that the length of the elongated body is sized such that the first end is positioned proximate the user's waist when the one or more support straps are coupled to a lower portion of the leg.

2. The supportive holder apparatus of claim 1, wherein the elongated rod comprises a fishing pole.

3. The supportive holder apparatus of claim 1, wherein the elongated rod comprises a monopod trigger stick.

4. The supportive holder apparatus of claim 1, wherein the length of the elongated body further comprises a midsection positioned between the first end and the second end, wherein the receiving cavity further comprises a first portion near the first end and a second portion near the midsection, the second portion comprising an intermediate diameter that is narrower than the first portion but wider than the diameter of the shaft.

5. The supportive holder apparatus of claim 4, wherein the one or more support straps comprise a first strap configured to be coupled proximate the a knee of the leg of the user, wherein the first strap is positioned proximate the midsection and the one or more support straps comprise a second strap configured to be positioned proximate an ankle of the leg of the user, wherein the second strap is positioned proximate the second end.

6. A supportive holder system comprising:
a supportive holder apparatus, comprising:
an elongated body comprising a length extending from a first end to a second end, the elongated body further comprising a receiving cavity at the first end configured to receive at least a portion of an elongated rod, wherein the second end comprises a shaft comprising a diameter that is narrower than the receiving cavity; and
one or more support straps each comprising a respective clip, each respective clip being configured to receive at least a portion of the elongated body, and at least one clip being configured to receive the second end of the elongated body wherein the at least one clip is configured to provide a base for securing the second end, having the diameter that is narrower than the receiving cavity, of the elongated body to a respective support strap;
wherein the one or more support straps are configured to couple to a user's leg during use such that the length of the elongated body is sized such that the first end is positioned proximate the user's waist when the one or more support straps are coupled to a lower portion of the leg; and
the elongated rod capable of being at least partially received within the receiving cavity.

7. The supportive holder system of claim 6, wherein the elongated rod comprises a fishing pole.

8. The supportive holder system of claim 6, wherein the elongated rod comprises a monopod trigger stick.

9. The supportive holder system of claim 6, wherein the length of the elongated body further comprises a midsection positioned between the first end and the second end, wherein the receiving cavity further comprises a first portion near the first end and a second portion near the midsection, the second portion comprising an intermediate diameter that is narrower than the first portion but wider than the diameter of the shaft.

10. The supportive holder apparatus of claim 1, wherein the elongated body is coupled to a shoulder strap for transport.

11. The supportive holder system of claim 6, wherein the elongated body is coupled to a shoulder strap for transport.

* * * * *